United States Patent

Miller, Sr. et al.

[11] Patent Number: 5,613,733
[45] Date of Patent: Mar. 25, 1997

[54] DEVICE FOR THE AUTOMATIC OPERATION OF A SEAT RELEASE LEVER

[75] Inventors: Michael T. Miller, Sr.; Joseph M. Nichols, Jr., both of Boyertown, Pa.

[73] Assignee: USSC Group, Inc., West Conshohocken, Pa.

[21] Appl. No.: 476,697

[22] Filed: Jun. 7, 1995

[51] Int. Cl.$^6$ .................................................. A47C 1/02
[52] U.S. Cl. ............................ 297/344.1; 74/625; 74/527
[58] Field of Search ........................... 297/344.1, 344.11, 297/344.19, 311, 337, 341, 342, 340, DIG. 10, DIG. 3, 463.1, 284.6; 248/429, 430; 74/625, 527

[56] References Cited

U.S. PATENT DOCUMENTS

| | | | |
|---|---|---|---|
| 2,579,597 | 12/1951 | Moroney | 248/430 |
| 2,579,599 | 12/1951 | Moroney | 155/14 |
| 2,684,108 | 7/1954 | Rappl | 248/430 |
| 2,805,702 | 9/1957 | Appleton | 297/344.1 X |
| 3,044,829 | 7/1962 | Dolgorukov | 297/344 |
| 3,479,097 | 11/1969 | Burke | 297/339 |
| 3,922,029 | 11/1975 | Urai | 297/344.1 X |
| 4,588,226 | 5/1986 | Young et al. | 297/349 |
| 4,671,572 | 6/1987 | Young et al. | 297/349 |
| 4,687,251 | 8/1987 | Kazaoka et al. | 297/337 |
| 4,884,841 | 12/1989 | Holley | 297/344.16 X |
| 4,888,833 | 12/1989 | Garcia et al. | 297/339 X |
| 4,909,570 | 3/1990 | Matsuhashi | 297/341 |
| 5,131,116 | 7/1992 | Bowdler | 16/114 |
| 5,348,373 | 9/1994 | Stiennon | 297/344.1 |

*Primary Examiner*—Milton Nelson, Jr.
*Attorney, Agent, or Firm*—Volpe and Koenig, P.C.

[57] ABSTRACT

An auxiliary release device for a seat assembly is disclosed providing a release device which is operated by an activator located in a readily accessible position for the operator. The release device includes a hydraulic power supply for activating the mechanical release lever to enable fore and aft adjustment of the seat.

7 Claims, 6 Drawing Sheets

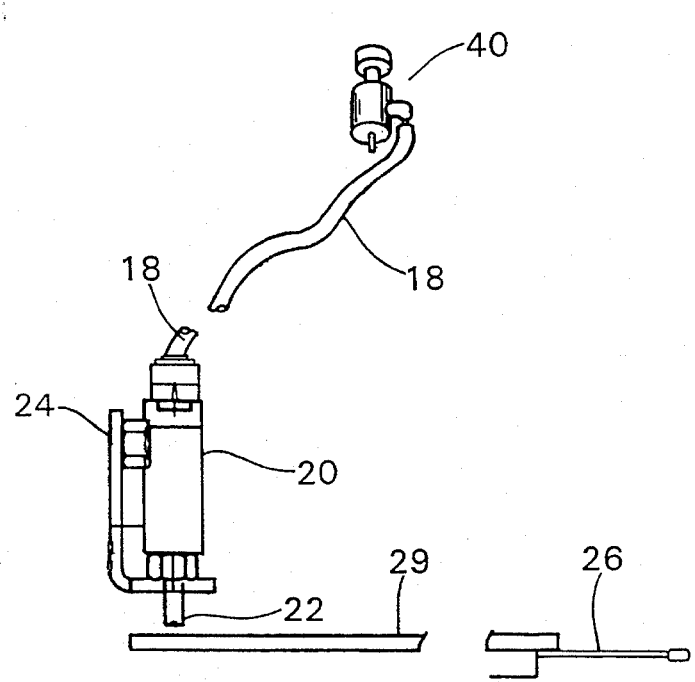
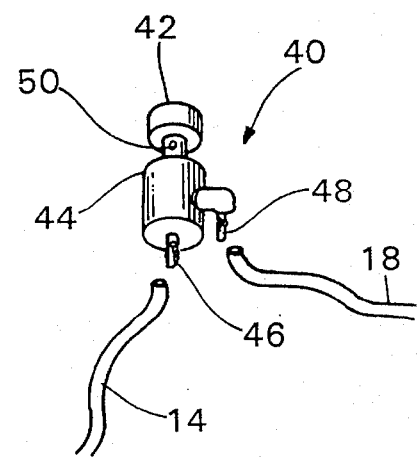
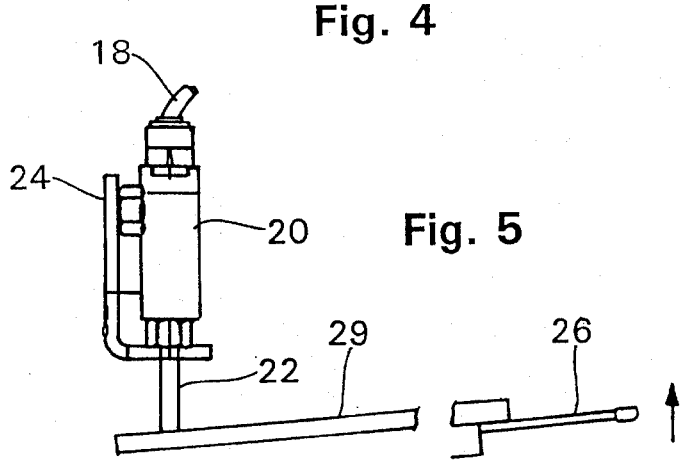
Fig. 4
Fig. 3
Fig. 5

5,613,733

DEVICE FOR THE AUTOMATIC OPERATION OF A SEAT RELEASE LEVER

BACKGROUND OF THE INVENTION

1. Field of the Invention

The present invention relates to an auxiliary vehicle seat release device powered by a pressurized fluid, preferably compressed air.

2. Description of Related Art

In most vehicles, the driver's seats are mounted on a track assembly which allows the seat to be selectively moved forward and rearwardly. A seat track assembly includes a mechanical latching mechanism which allows the seat to be secured at a selected position fore and aft. A seat adjustment lever is operatively connected with the latching mechanism for disengaging the latching mechanism. The vehicle operator pulls the lever up or to the side, thereby enabling the seat to be moved back and forth along the tracks.

In most vehicles, the seat adjustment lever is located well below the seat or in a difficult position to reach on the side where access is obscured. The lever is difficult to reach for handicapped or physically impaired persons. Older people or people with back problems may also find the manual adjustment difficult to use. Power seats may allow easier adjustment but are inherently more complicated, expensive and slower than a manual release system. Many people are unable to purchase power seats due to their added costs. An electromechanical release mechanism is shown in U.S. Pat. No. 5,348,373. This mechanism uses an electromechanical solenoid or motor to disengage a latch and pawl on the seat's slide rails. A cable activated release is shown in U.S. Pat. No. 2,579,599. This release uses a flexible cable to actuate a plunger designed to fit in within a series of apertures. These systems involve a number of mechanical components which are subject to failure and are difficult to manufacture. Furthermore, electrical mechanisms are dependent on the vehicle's battery which is vulnerable to discharge or malfunction. Cable driven mechanisms are subject to stretching, bending or fraying of the cable wire. In addition, these systems replace rather than supplement a vehicle's manual release lever. The manual lever is desirable to retain as a backup or for those who prefer its simplicity and reliability. For the foregoing reasons, there is a need for a device which is simple to manufacture and install, reliable and provides easier adjustability of the seat adjustment lever without replacing the lever. The mechanical lever mechanism is retained and thus acts as a back-up.

SUMMARY OF THE INVENTION

It is a primary object of the present invention to provide an assist for a vehicle's manual seat release and bring the adjustment within the reach of the operator of the vehicle. Another object of the invention is to provide a reliable seat release assist which is easier to operate and easier to install and maintain without having to use complicated electrical or mechanical mechanisms. A further object of the invention is to provide a device which is not subject to the failures common with electrical systems or worn mechanical systems.

BRIEF DESCRIPTION OF DRAWINGS

FIG. 3 is a schematic view of the activating button.

FIG. 4 is a schematic view of the cylinder and piston pin.

FIG. 5 is a schematic view of the activated piston pin.

DETAILED DESCRIPTION OF THE PREFERRED EMBODIMENT

Figure 1:
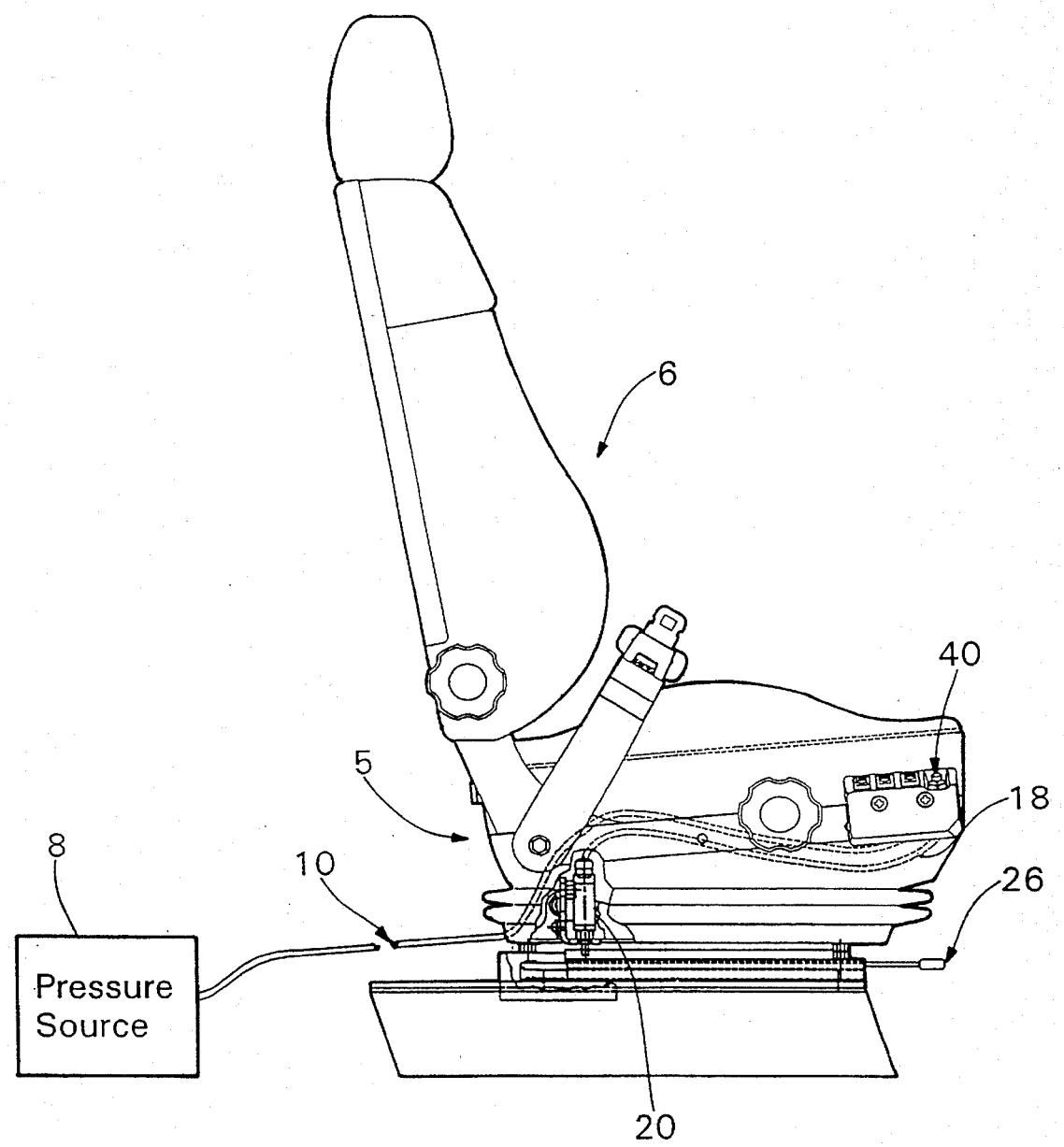
FIG. 1 is a side view of the seat assembly having the seat release device of the present invention.

A seat release device 5 in accordance with the present invention is shown in FIG. 1. The release device 5 is installed within the seat assembly 6. The release device 5 is powered by a high pressure fluid source 8 (preferably compressed air). Release device 5 may be pressured by a vehicle's internal air supply. For example, the upstream line 14 may be connected to the vehicle's pneumatic brake line to provide pressured air to the device 5. The device 5 further comprises a readily accessible activating button 40, a cylinder 20 and manual release lever extension 29. A movable piston 22 is enclosed in the cylinder 20. The activating button 40 is integrated on the side control panel of the seat 6 for easy access. In alternative embodiments of the invention, button 40 is placed on the dashboard, shifter panel, or door.

Figure 2:
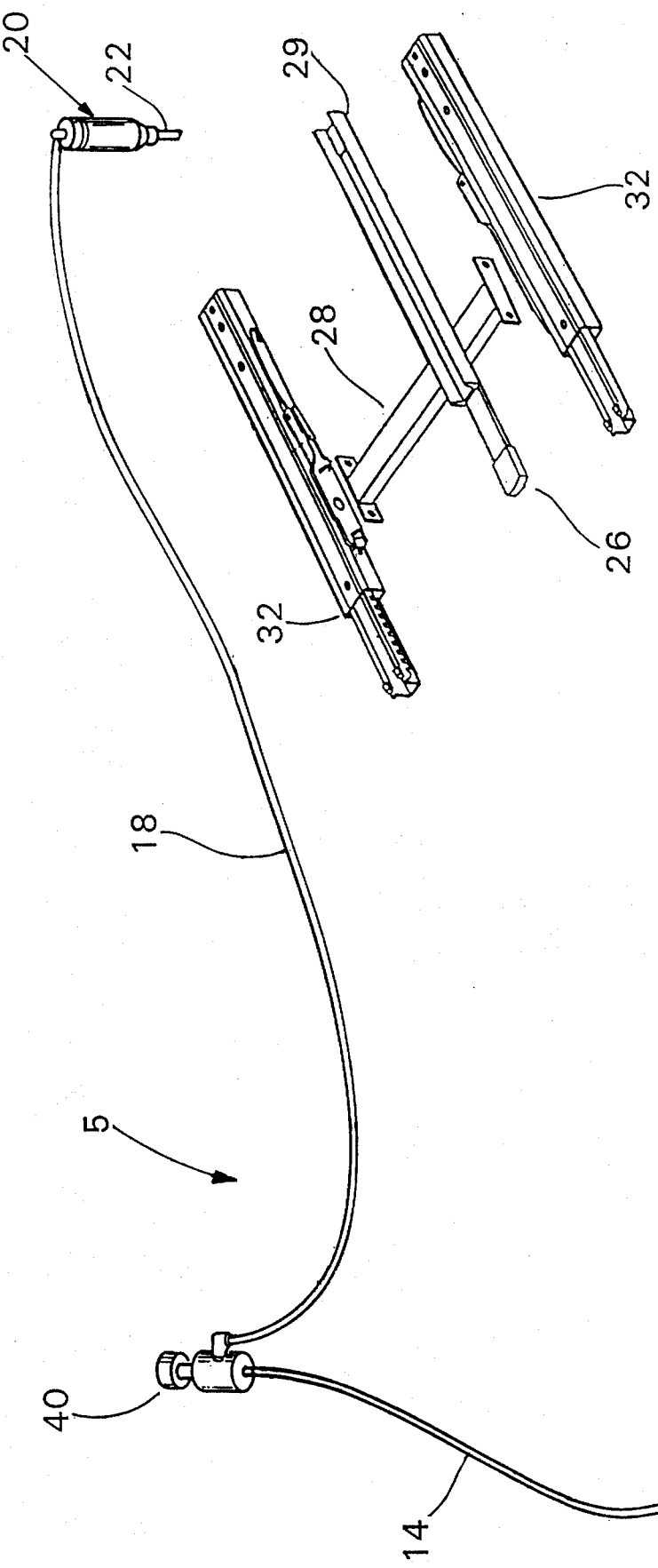
FIG. 2 is a perspective view of the seat release device.

As shown in FIG. 2, the release device 5 has a series of pressure lines. Upstream line 14 receives pressure from the high pressure source 8 (preferably compressed air) at one end. The other end of upstream line 14 is connected to an activating button 40. Activating button 40 is connected to one end of downstream line 18. The other end of downstream line 18 is connected to cylinder 20. Disposed within the cylinder 20 is a movable piston 22 which is activated by pressure from downstream line 18. In the preferred embodiment the cylinder 20 is a Clippard Instrument Laboratories Part Number SSR-12-1.

Referring now to FIG. 3, activating button 40 has a top 42 which moves vertically within body 44. Button 40 has an input nozzle 46 that accepts pressurized fluid from the upstream line 14. An exit nozzle 48 connects button 40 with downstream line 18. Upon depression of the top 42, pressurized fluid flows from upstream line 14 through nozzle 48 and into downstream line 18. The pressure within downstream line 18 then activates the piston 22 to lift the seat release lever 26, see FIGS. 4 and 5. When the button 40 is released, the pressure is dispelled through hole 50. In the preferred embodiment the button 40 is a Clippard Instrument Laboratories Part Number 11916-3.

As shown in FIG. 4, the cylinder 20 is vertically mounted to plate 24. Downstream line 18 connects cylinder 20 and button 40. Piston 22 extends from a lower end of the cylinder 20. In a neutral position, the piston 22 is retracted. The piston 22 moves downward in response to pressure from downstream line 18. The pressure in downstream line 18 overcomes the force of an internal spring (not shown) in order to move the piston 22 downward. As shown in FIG. 5, when downstream line 18 is pressurized, the piston 22 contacts with seat release lever extension 29. The downward pressure of piston 22 on lever extension 29 lifts the manual release lever 26. A contact pad (not shown) may be placed on the extension member 29 at the position where the piston 22 touches the member 29. When button 40 is released, the piston 22 retracts within cylinder 20, as shown in FIG. 4. An internal spring (not shown) then retracts the piston 22.

Figure 6:
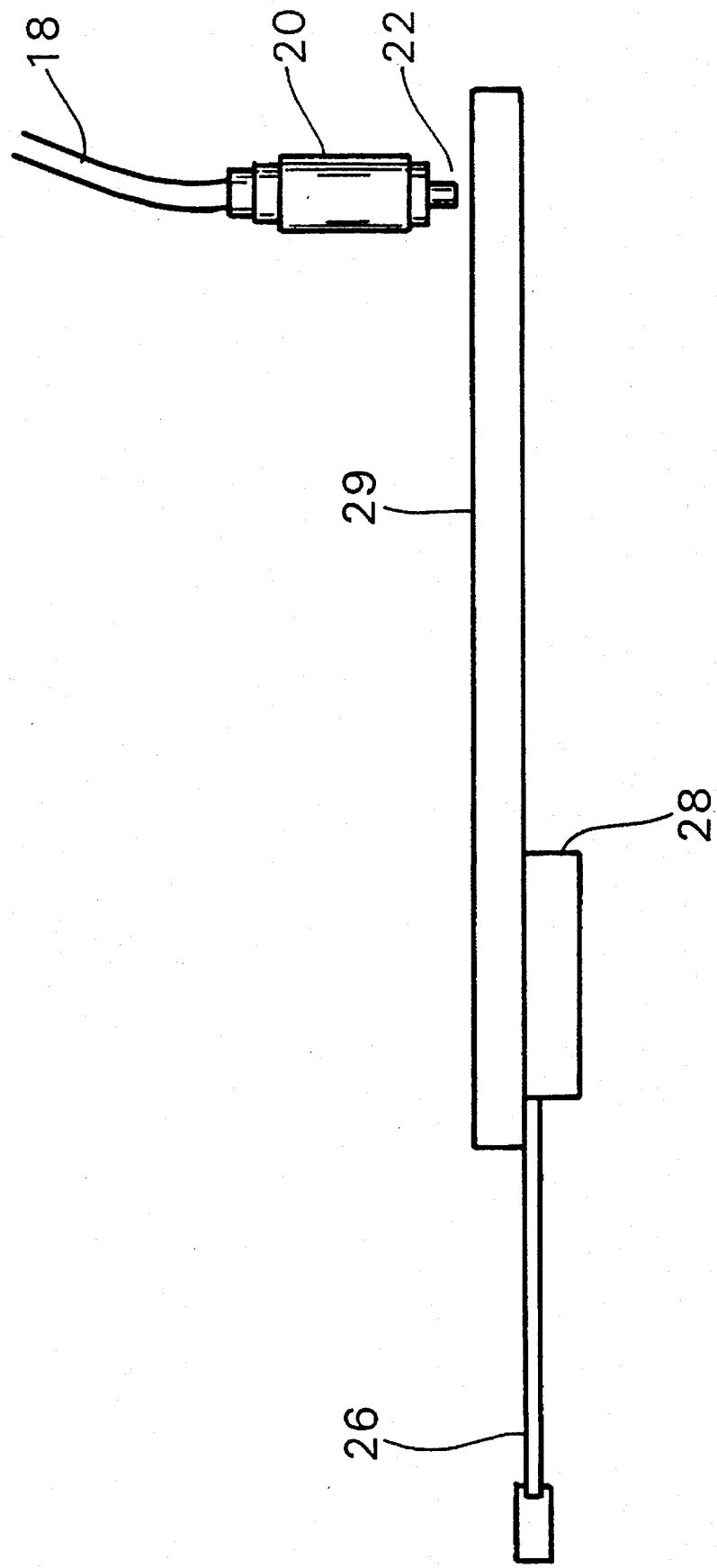
FIG. 6 is a side view of the seat lever extension.

As shown in FIGS. 2 and 6, the lever 26 and lever extension member 29 are mounted on a supporting bar 28. The supporting bar 28 is attached on both ends to seat track latching means 32. If the seat tracks 32 lock on only one side, the supporting bar 28 will engage only that side. Downward pressure on the far end of the extension 29 caused by piston 22, results in a reciprocal upward motion of the lever 26.

The upward motion of the lever 26 disengages the latching means 32. Once disengaged, the operator can adjust the fore and aft position of the seat 6. Releasing the button 40 depressurizes downstream line 18 which retracts the piston 22. Upon retraction, the piston 22 no longer contacts with the lever extension 29. The seat track latching means 32 then re-engage. In a neutral state, no pressure is provided to downstream line 18 and the seat tracks remain engaged. After release of the button, excess pressure within device 5 is expelled by hole 50 on the shaft of button 40.

As shown in FIG. 1, the manual lever 26 is retained. The lever 26 functions as a bypass for the device 5. In case of pressure failure or malfunction, the lever 26 is used to adjust the fore and aft position of the seat 6. The seat 6 is adjusted by lifting the lever 26 which releases the seat tracks 32. The operator may just prefer the manual lever 26 to adjust the seat position.

Figure 7:
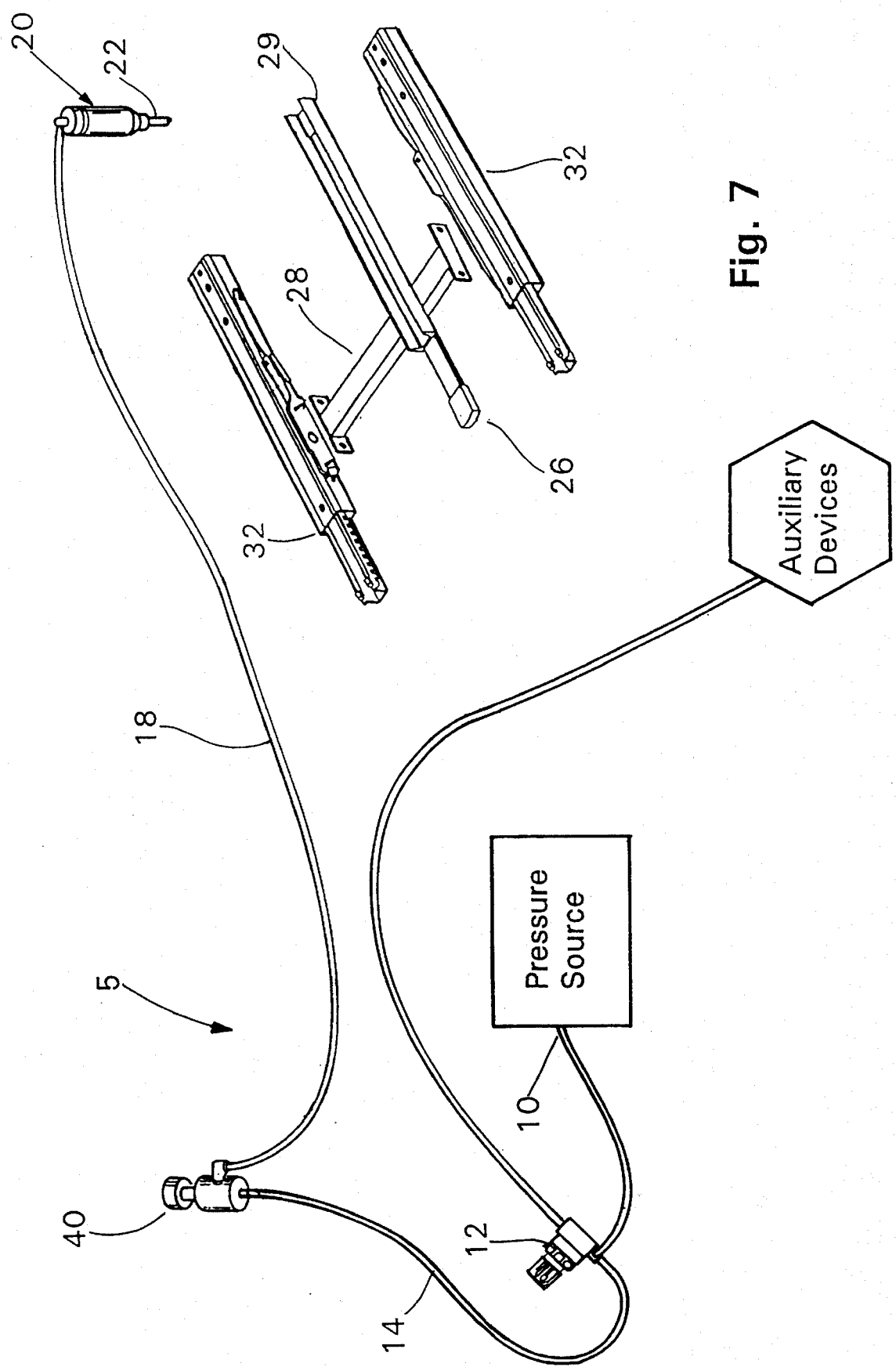
FIG. 7 is a perspective view of an alternate embodiment of the invention.

As shown in FIG. 7 an alternate embodiment of the invention uses an in-line regulator 12 to monitor the pressure levels in the device 5. The regulator 12 functions to regulate pressure to auxiliary devices such as lumbar bags which may operate at a lower pressure i.e. psi. Device 5 is designed to operate at vehicle air pressure, typically 120 psi, but can be configured to operate at other pressures.

Figure 8:
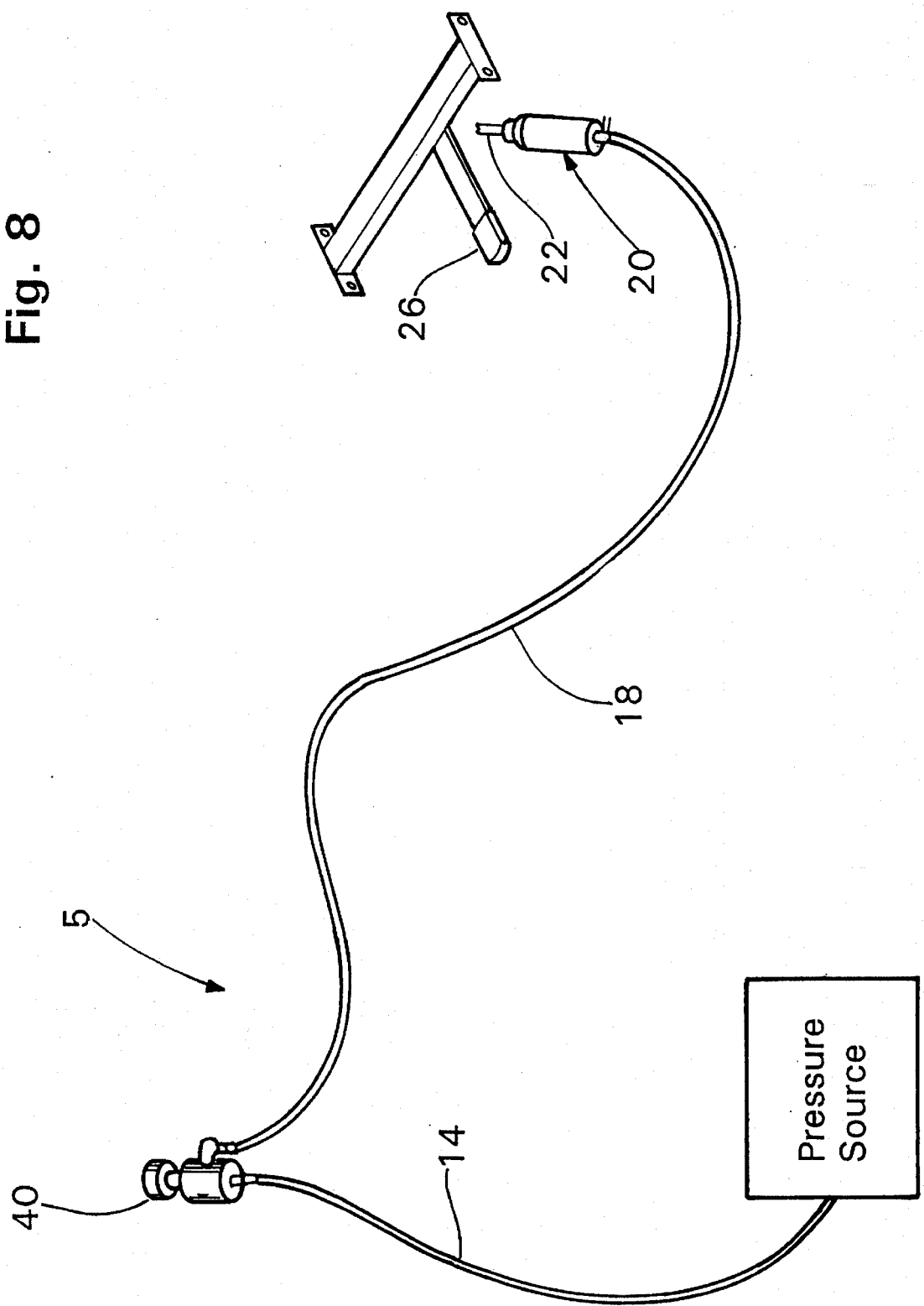
FIG. 8 is a perspective view of another alternate embodiment of the invention.

In an alternate embodiment of the invention, as shown in FIG. 8, the cylinder 20 is positioned below the lever 26. When engaged by the button 40, the cylinder piston 22 extends and pushes the lever 26 upward to disengage the seat tracks 32. The seat 6 then may be moved to the desired position. Upon releasing the button 40, the piston 22 is retracted and the seat tracks 32 are reengaged. In another embodiment of the invention, the cylinder 20 is mounted sideways to engage seat handles which are operated by a sideways motion.

While the present invention has been described in terms of the preferred embodiment, other variations which are within the scope of the invention as outlined in the claims below will be apparent to those skilled in the art.

I claim:

1. An auxiliary release mechanism for use with a manually operated seat release, the auxiliary release mechanism comprising:

a fluid operated cylinder connected to a movable member that selectively engages the manual release, the movable member including a channel shaped member adapted for extending from the manual release;

a source of fluid to operate the cylinder; and a control means, between the cylinder and the fluid source, that controls movement of the movable member for selective engagement with the manually operated release.

2. The auxiliary release mechanism of claim 1 wherein the control means comprises:

a button having an upstream nozzle connected to the fluid source and a downstream nozzle connected to the cylinder, the button when depressed allowing fluid to flow from the fluid source to the cylinder.

3. The auxiliary release mechanism of claim 1 wherein the source of fluid is an air compressor.

4. An auxiliary release mechanism for a vehicle seat mounted on tracks for displacement between front and rear positions, the vehicle seat having a manually operated release which when disengaged, enables movement of the seat between the front and rear positions, the auxiliary seat release mechanism comprising:

a pressurized fluid source;

a fluid operated cylinder including a movable piston;

a control means interconnecting the cylinder and fluid source to control movement of the piston; and a channel shaped member with a first end adapted to be connected to the manually operated release and a second end positioned for engagement with the movable piston whereby upon activating of the control means, the piston contacts the channel shaped member thereby disengaging the manually operated release.

5. The release mechanism according to claim 4 wherein said control means comprises:

a button having an upstream nozzle connected to the fluid source and a downstream nozzle connected to the cylinder, the button when depressed allowing fluid to flow from the fluid source to the cylinder.

6. The release mechanism according to claim 4 wherein the fluid source comprises:

an air compressor.

7. An auxiliary release mechanism for a vehicle seat mounted on tracks for displacement between front and rear positions, the vehicle seat having a manually operated release which when disengaged, enables movement of the seat between the front and rear positions, the auxiliary seat release mechanism comprising:

a pressurized fluid source;

a fluid operated cylinder including a movable piston;

a control means interconnecting the cylinder and fluid source to control movement of the piston; and a channel shaped extension member with a first end adapted to be connected to the manually operated release and a second end positioned for engagement with the movable piston whereby upon activating of the control means, the piston contacts the channel shaped member thereby disengaging the manually operated release.

* * * * *